US008922877B1

(12) United States Patent
Goodno et al.

(10) Patent No.: US 8,922,877 B1
(45) Date of Patent: Dec. 30, 2014

(54) POLARIZATION CONTROL WITH MODE STABILITY

(71) Applicant: Northrop Grumman Systems Corporation, Falls Church, VA (US)

(72) Inventors: Gregory D. Goodno, Los Angeles, CA (US); Stuart McNaught, Redondo Beach, CA (US); Peter Thielen, Long Beach, CA (US); Joshua Rothenberg, Los Angeles, CA (US); Marty Wacks, Redondo Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 13/958,777

(22) Filed: Aug. 5, 2013

(51) Int. Cl.
H01S 3/131 (2006.01)

(52) U.S. Cl.
USPC ........................................ 359/337; 359/341.1

(58) Field of Classification Search
USPC ........................................ 359/340, 337, 341.1
See application file for complete search history.

(56) References Cited

U.S. PATENT DOCUMENTS

| 5,309,530 | A | * | 5/1994 | Bergano et al. | 385/1 |
| 5,309,535 | A | * | 5/1994 | Bergano et al. | 385/38 |
| 5,933,271 | A | | 8/1999 | Waarts et al. | |
| 6,850,712 | B1 | | 2/2005 | Delavaux et al. | |
| 8,054,539 | B2 | * | 11/2011 | Du | 359/337 |
| 8,135,050 | B1 | * | 3/2012 | Stadler et al. | 372/31 |
| 8,761,607 | B2 | * | 6/2014 | Du | 398/152 |
| 2013/0044770 | A1 | | 2/2013 | Rakuljic | |
| 2014/0086267 | A1 | * | 3/2014 | Dennis et al. | 372/6 |

FOREIGN PATENT DOCUMENTS

| EP | 1376908 | 1/2004 |
| EP | 2153554 | 3/2013 |

OTHER PUBLICATIONS

Ciaramella, E. et al; "Stabilizing PMD Compensators by Means of Polarization Dithering," Photonics Technology Letters, IEEE, vol. 19, No. 23, pp. 1892-1894, Dec. 1, 2007.
Koch, B. et al; "Record 59-krad/s Polarization Tracking in 112-Gb/s 640-km PDM-RZ-DQPSK Transmission," Photonics Technology Letters, IEEE, vol. 22, No. 19, pp. 1407-1409, Oct. 1, 2010.
Fang, Qiang et al.; "High power and high energy monolithic single frequency 2 µm nanosecond pulsed fiber laser by using large core Tm-doped germanate fibers: experiment and modeling," Optics Express, vol. 20, No. 15; pp. 16410-16420; Jul. 2012.
Nan, Jia et al.; "Study on the polarization scrambling time for ultra-high-speed optical fiber communication system," Proc. SPIE vol. 7509, 2009 International Conference on Optical Instruments and Technology: Optoelectronic Devices and Integration, pp. 75091A-1-75091A-6; Dec. 1, 2009.
Han, Dahai et al; "Research on PMD mitigation by using distributed fast polarization scrambling and FEC," Proc. SPIE vol. 7986, Passive Components and Fiber-Based Devices VII, pp. 798613-1-798613-6; Jan. 19, 2011.

* cited by examiner

Primary Examiner — Mark Hellner
(74) Attorney, Agent, or Firm — Carmen Patti Law Group, LLC

(57) ABSTRACT

A system and method for controlling polarization in a fiber amplifier is disclosed. A polarization dither waveform is applied to a polarization controller so that dithering does not trigger PI-HOMI (Polarization-Induced High Order Mode Instability). The dither waveform may have a period that is much less than the thermal diffusion time across the fiber amplifier core. The dither waveform may also have a slew rate (defined in degrees/second on the Poincaré sphere) that is much slower than the thermal diffusion time across the fiber amplifier core.

20 Claims, 4 Drawing Sheets

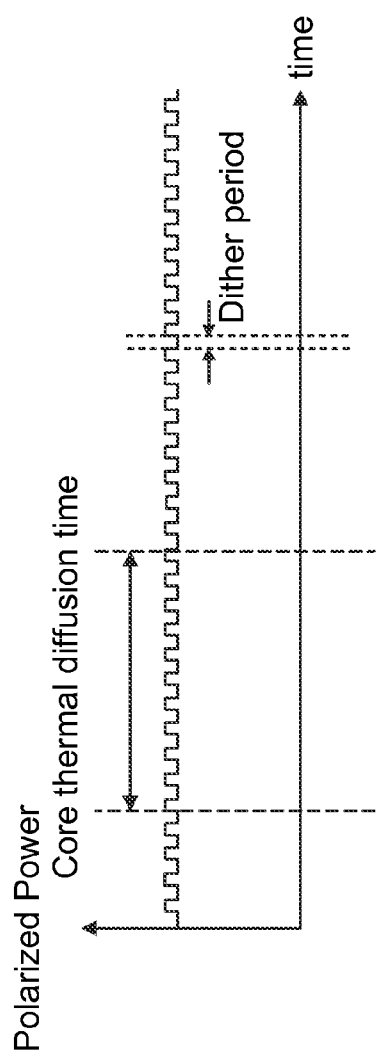
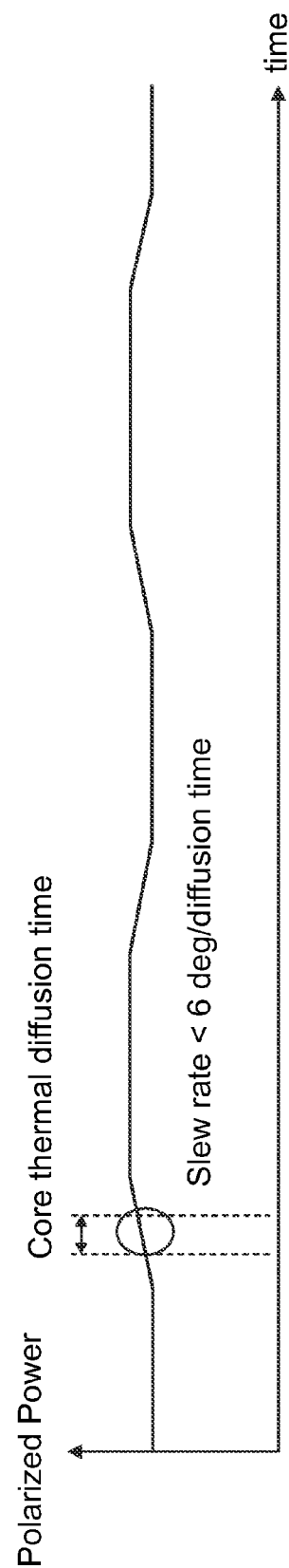

POLARIZATION CONTROL WITH MODE STABILITY

STATEMENT OF GOVERNMENT RIGHTS

This invention was made with Government support under Contract No. W9113M-10-C-0022 (Air Force). The government has certain rights in this invention.

CROSS-REFERENCE TO RELATED APPLICATIONS

This application contains subject matter that is related to the subject matter of the following applications, which are assigned to the same assignee as this application. The below-listed applications are hereby incorporated herein by reference in their entireties:

"MULTICHANNEL POLARIZATION STABILIZER," by Goodno et al., application Ser. No. 13/419,054, filed Mar. 13, 2012.

BACKGROUND

The invention relates generally to high power fiber laser amplifiers and more particularly to polarization control of fiber laser amplifiers.

There is a significant need for high power fiber laser amplifiers, for example, in the fields of materials processing, military and scientific applications, and as sources for further power or energy scaling via beam combining methods. A high power fiber laser receives an input signal beam from a master oscillator, which may be processed by a controller, then combined with a pump laser light in a fiber amplifier to provide a high power output. The controller can be used to perform a number of adjustments to the signal beam so as to improve the performance or control the characteristics of the high power laser output, such as its phase, amplitude, or polarization state.

High power fiber laser amplifiers use optical fiber to amplify the power from the master oscillator. Light propagating in the fiber amplifier is constrained to one or more spatial "modes" defined by the waveguide of the optical fiber. It is generally desirable to confine all the amplified power from the fiber amplifier into a single mode, specifically the lowest order fundamental mode of the waveguide since this mode yields the highest spatial brightness output. Some fiber amplifier waveguides are designed to have a single mode by designing the light to be confined to very small core radii, but these fibers are typically ill-suited for kilowatt class fiber amplifiers as the high optical intensities in the fiber core result in undesirable nonlinear effects and optical damage. Hence, most fibers suitable for kW-class amps support multiple fiber modes, consisting of both the desired fundamental mode that is optimum for power amplification along with one or more higher order modes (HOMs). If light from the fundamental mode is coupled by various circumstances into any of the HOMs, it will diminish the quality of the output. Hence, a key design consideration for kW fiber amplifiers is to ensure near-100% of the output power is contained in the fundamental mode rather than in any of the HOMs, by preventing power transfer in the amplifier fiber from the fundamental mode to any HOM.

One undesirable nonlinear process that presently imposes a scaling limit on fiber amplifier output power by transferring power from the fundamental mode to HOMs is called the High Order Mode Instability (HOMI). In the HOMI process, a moving long-period grating (LPG) in the fiber core refractive index is written by the interference pattern between the fundamental mode and an HOM as explained in C. Jauregui et al, "Physical origin of mode instabilities in high power fiber laser systems," Opt. Express 20, 12912 (2012).

Numerous experimental studies have shown that the mechanism for the refractive index change is thermal (dn/dT). As output power increases, the LPG amplitude increases, and coupling gain builds up exponentially for power transfer from the fundamental mode to the HOM, eventually reaching a threshold level above which power dynamically fluctuates between these two modes. The dynamic fluctuation in modal powers is consistently observed to occur on timescales corresponding to the thermal diffusion time across the fiber core (typically ~ms/kHz for 20-um class core diameters in silica fiber).

Since fiber amplifiers typically use an optical fiber that is non-polarization maintaining, a polarization controller is often used to ensure near-100% of the output power is contained within a single desired state of polarization (SOP). A small dither is added to the polarization signal, and then a portion of the output of the fiber amplifier is used to provide a feedback signal to control the polarization.

It has been observed that changing the polarization of light input to the fiber amplifier abruptly triggers a conversion of the output of the fiber amp from a fundamental mode to a higher order mode, via the HOMI process. In some cases, polarization dithering has been observed to lower the threshold for the onset of high-order mode instability in kW fiber amplifiers to approximately 60-90% of total output, significantly reducing the achievable output power from fiber amps with stable polarization. In other words, it is possible to have high power or stable polarization, but not both. This mechanism is called the polarization-induced high order mode instability (PI-HOMI).

Thus, a need exists for fiber amplifiers with stable polarization control that does not trigger the PI-HOMI process and enables output up to 100% of the regular power threshold of the HOMI process.

SUMMARY

A system and method for controlling polarization in a fiber amplifier is disclosed. A polarization dither waveform is applied to a polarization controller so that dithering does not trigger PI-HOMI (Polarization-Induced High Order Mode Instability). The dither waveform may have a period that is much less than the thermal diffusion time across the fiber amplifier core. The dither waveform may also have a slew rate (defined in degrees/second on the Poincaré sphere) that is much slower than the thermal diffusion time across the fiber amplifier core The invention in one implementation encompasses an apparatus. The apparatus comprises a fiber amplifier system including a polarization actuator for receiving a signal beam from a master oscillator and adjusting the polarization of the signal beam in accordance with a control signal, a fiber amplifier for receiving the adjusted signal beam from the polarization controller and generating an amplified output beam and a dither signal generator for generating a dither waveform, said dither waveform input to the polarization actuator as the control signal, wherein parameters of said dither waveform are selected based on the thermal diffusion time across a core of the fiber amplifier so that the dither waveform does not trigger polarization-induced high order mode instability (PI-HOMI).

In a further embodiment, the intention encompasses a fiber amplifier system A fiber amplifier system, including a master oscillator generating a signal beam, a polarization actuator for receiving the signal beam from the master oscillator and adding a polarization dither in accordance with a feedback signal before outputting the signal beam to the fiber amplifier, a fiber amplifier for receiving the signal beam and outputting an amplified beam, a beam sampler for receiving an output of the fiber amplifier, polarization filter, coupled to the beam sampler, for transmitting only power contained within a desired output state of polarization (SOP) and a controller for generating the feedback signal, the controller further including a dither signal generator for generating a dither waveform a processor, coupled to the polarization filter and the dither signal generator for generating an error signal and a summer coupled to the dither signal generator and the processor for generating the feedback signal, wherein parameters of said dither waveform generated by the dither signal generator are selected based on the thermal diffusion time across a core of the fiber amplifier so that the dither waveform does not trigger polarization-induced high order mode instability (PI-HOMI).

In another embodiment, the invention encompasses A method of operating a fiber amplifier, with the steps of receiving a signal beam from a master oscillator, adjusting the polarization of the signal beam in accordance with a control signal, amplifying the adjusted signal beam in an optical fiber amplifier having a core to generate an output signal, generating a dither waveform, the dither waveform having parameters selected based on the thermal diffusion time across the core of the fiber amplifier so that the dither waveform does not trigger polarization-induced high order mode instability (PI-HOMI) in the fiber amplifier and combining the dither waveform with an error signal derived from the output signal to generate the control signal.

In any of the above embodiments, a period of the dither waveform is much less than the thermal diffusion time.

In any of the above embodiments, a slew rate of the dither waveform is much slower than the thermal diffusion time.

In any of the above embodiments, the slew rate is reduced by reducing the amplitude in degrees of a step of the dither waveform.

In any of the above embodiments, the slew rate is reduced by increasing the transition time between dither steps.

In any of the above embodiments, the dither waveform is a continuous transition, or sinusoidal, waveform.

In any of the above embodiments, the slew rate is defined in degrees/second on the Poincaré sphere and the slew rate is less than 1% (6 degrees of rotation on the Poincaré sphere).

DESCRIPTION OF THE DRAWINGS

Features of example implementations of the invention will become apparent from the description, the claims, and the accompanying drawings in which:

FIGS. 3A and 3B are charts illustrating a dither rate in an embodiment of the invention.

DETAILED DESCRIPTION

Figure 1:
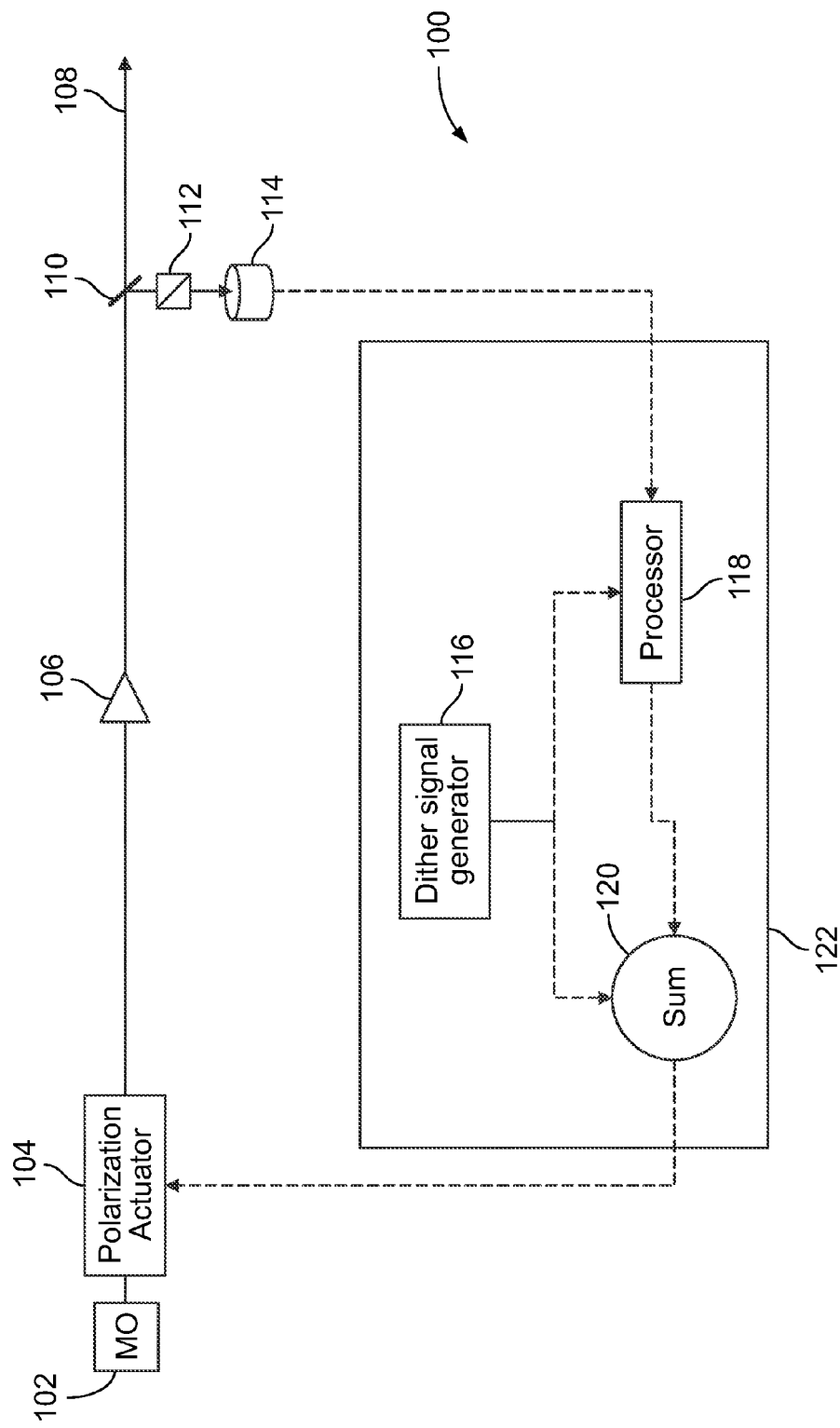
FIG. 1 is a representation of a fiber amplifier used in the present invention.

Turning to FIG. 1, a polarization-controlled fiber amplifier system 100 is shown. A master oscillator 102 outputs a polarized signal beam to a polarization actuator 104. Actuator 104 adjusts the state of polarization of the output light according to signals provided by the controller 122. The polarization-adjusted output light from actuator 104 is sent to amplifier 106 which amplifies the signal to produce a high power laser output 108. Since the fiber in amp 106 is not polarization-maintaining, it also imposes an essentially random polarization birefringence on the amplified beam 108, resulting in no correlation between the SOPs (states of polarization) of the input to 104 and output 108. Beam sampler 110 takes a sample of output beam 108 and sends it to polarization filter 112. Polarization filter 112 is aligned to transmit only light contained in the desired output polarization state to detector 114, which generates an electrical signal proportional to the polarized output power that serves as the plant output signal for the controller 122 so as to maximize the polarized power at output 108.

Controller 122 serves to maximize the plant output signal hence maximizing light in the desired polarization state at the output 108. It does so by first generating a small dither waveform using dither signal generator 116 and then applying it to the polarization actuator 104 to generate a small modulation in the state of polarization (SOP) of the light entering the amplifier 106 (typically only a few percent or less change in the polarized power fraction). This also modulates the SOP of the output 108, and thereby modulates the photodetector signal from detector 114. Processor 118 receives the photodetector signal and the dither waveform and calculates an error signal using some standard algorithm (e.g. hill-climbing) so as to maximize the photodetector signal. This error signal is superimposed with the dither waveform in a summer 120 before being applied to the polarization actuator, hence providing closed loop feedback control to generate near 100% power in the desired SOP at 108.

Prior art polarization controllers utilize some form of digital waveform as the dither waveform. They also typically seek to attain the fastest possible control speed to maximize error rejection. These prior art controller features have been observed to cause Polarization Induced High Order Mode Instability (PI-HOMI). HOMI limits the power of the amplifier by coupling to higher order fiber modes once a certain threshold of power has been reached. PI-HOMI further limits the output power of a fiber laser and has been observed at 60-90% of the HOMI threshold. PI-HOMI appears to be triggered by fast changes in polarization caused by dithering imposed by a polarization controller.

Figure 2:
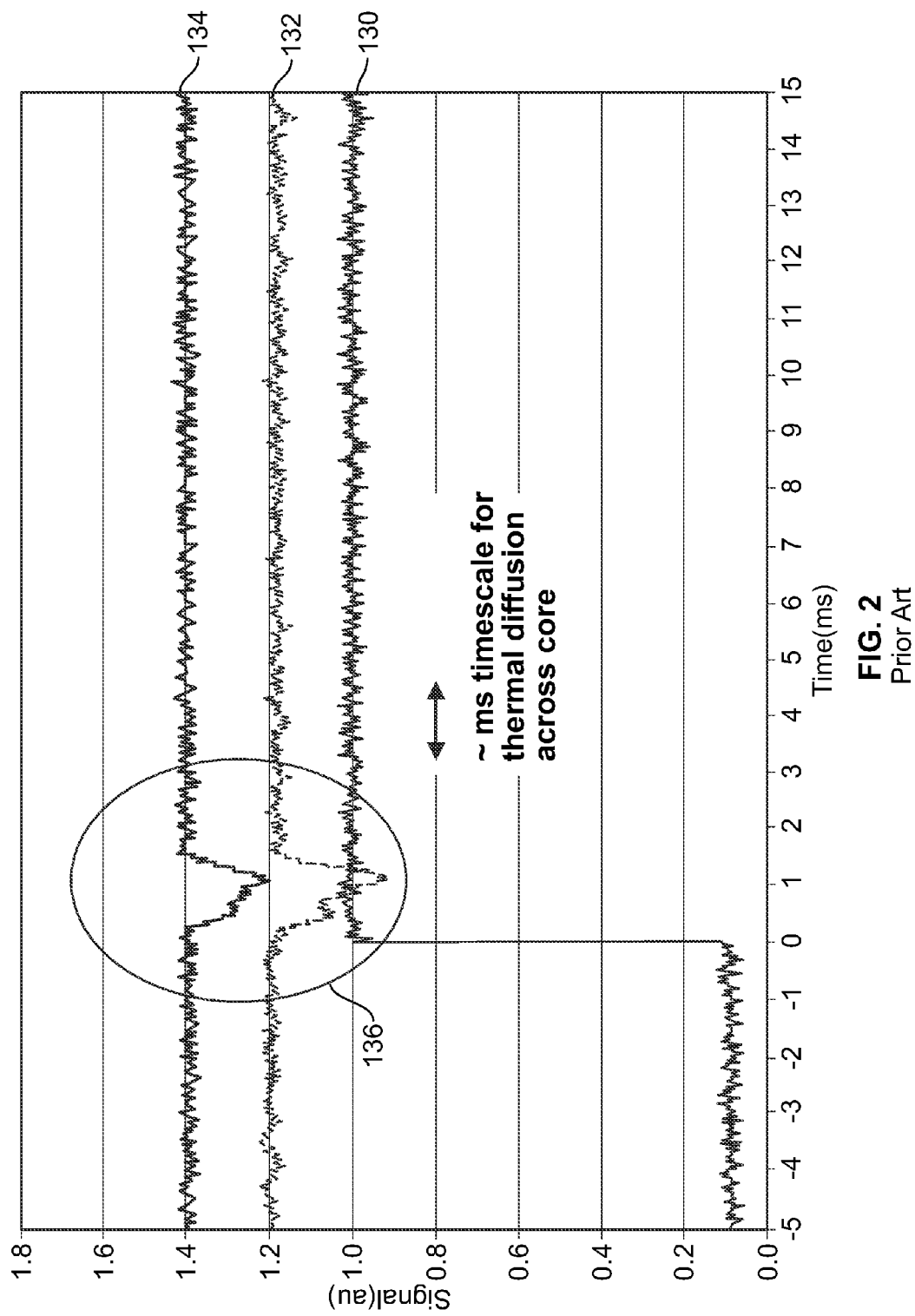
FIG. 2 is a chart illustrating prior art polarization induced high order mode instability triggered by changes in polarization dithering.

FIG. 2 shows the dynamics of the power output in the desired fundamental mode from a prior art fiber amplifier operating close to the HOMI instability threshold when the SOP of the input light is abruptly changed by a small amount. Signal strength in an arbitrary unit (a.u.) is shown on the vertical axis while time in ms is shown on the horizontal access. Line 130 depicts the control voltage applied to a polarization actuator (104 from FIG. 1), while line 132 depicts the polarized power at, for example, output 108 of FIG. 1. Line 134 depicts the total power at output 108. As shown at 136, the output power in the fundamental mode drops transiently on a ms-class timescale after changing the input SOP. The lost power is coupled to higher order modes via the PI-HOMI effect. As the fiber output power is increased the fraction of lost power increases as well. Under active polarization control, such small changes to the input SOP are continually applied by controller 122 dither, hence the power loss can be continuous. Moreover, the loss in power in the fundamental mode will be sensed by the detector 114 and will result in a change to the detector signal sent back to the controller, often by much larger amounts than due to the small polarization dither. Hence, this can drive the polarization controller to an unstable state as the true polarization error signal is overwhelmed by the dynamic power fluctuations between modes.

The present invention proposes a polarization controller that uses a polarization dither waveform such that it does not trigger PI-HOMI. FIGS. 3A and 3B show an examples of polarization dither waveforms that do not trigger PI-HOMI.

Polarization actuator 104 FIG. 1 is constrained to slew rates, modulation depths, and modulation periods that avoid triggering fiber mode instability. We have mapped out accessible parameter space for the polarization control and built and demonstrated a polarization controller 122 that works within this parameter space to extend operations to 100% power. Since the physical mechanism of the mode instability is due to the formation of thermal gradients in the fiber amplifier core, the thermal diffusion time across the core defines a characteristic resonant timescale for the instability, between 0.3 and 3 ms for most fibers suitable for use in kW amps. Perturbing the polarization either faster or slower than this resonant timescale allows for stable control.

The key requirements for the polarization controller dither waveform that must be met to avoid PI-HOMI are either:

Case 1: Fast Dither.

In one embodiment, the invention uses a dither waveform period that is much less than the thermal diffusion time across the fiber amplifier core as shown in FIG. 3A. This will ensure that the thermal profile in the fiber amplifier core is nearly constant in time, and thus will not trigger PI-HOMI. A fast dither is generally preferable in terms of performance (control bandwidth) and waveform flexibility (large amplitude steps are fine), but may involve more expensive components and drive electronics. For example, the polarization actuator 104 may need to be a relatively expensive electro-optic modulator (EOM) such as a TE-TM (transverse-electric-transverseimagnetic) mode convertor rather than a slower but cheaper piezo-squeezer device (for example, a PolaRITE, polarimeter, and variable DGD from General Photonics Corporation). Moreover, the drive electronics may need to be high voltage, high speed which is costly compared to lower voltage and slower speed devices.

Case 2: Slow Dither.

In another embodiment, the invention uses a dither slew rate (defined in degrees/second on the Poincaré sphere) that is much slower than the thermal diffusion time across the fiber amplifier core. This will ensure that the core temperature profile can respond essentially instantaneously to any slow change in the SOP, thus eliminating any dynamic change in the HOMI threshold. The dither slew rate may be reduced by reducing the amplitude (in degrees) of the dither step, or by increasing the transition time between dither steps (possibly using a continuous transition waveform, e.g. a sinusoid instead of a digital waveform); or both. The maximum slew rate, or dither step amplitude, is driven by the constraint that the polarized power change should be less than 1% (corresponding to approximately 6 degrees of rotation on the Poincaré sphere) during the thermal diffusion time. For a fiber with a 1 ms thermal diffusion time this corresponds to a slew rate of less than 6 deg/ms.

Figure 4:
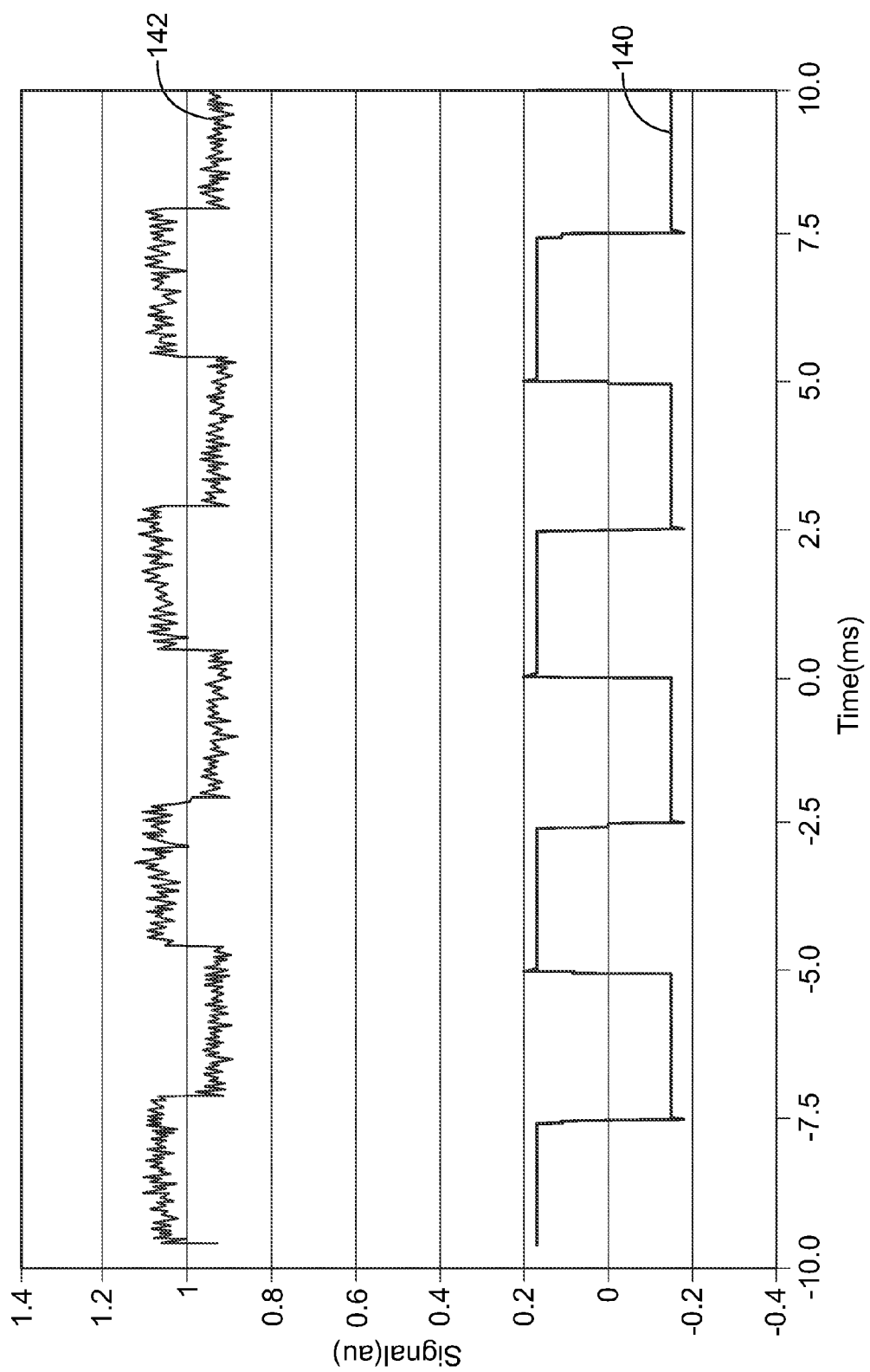
FIG. 4 is a diagram illustrating the performance of a polarization controller of the present invention.

FIG. 4 shows test results of applying fast dithering (Case 1). Line 140 in FIG. 4 depicts the control voltage applied to a polarization actuator (104 from FIG. 1). Line 142 depicts the polarized output power at, for example, output 108 of FIG. 1. The same SOP dither step that caused instability in FIG. 2 is applied at a high frequency (200 kHz) meeting the Case 1 criteria (50 us period less than approximately 1 ms thermal diffusion time). As shown in FIG. 4, no instability is observed, since the polarized output power 142 perfectly tracks the applied polarization dither signal 140 without additional dynamic changes. A controller 122 was built and tested with using this dither waveform and resulted in stable operation up to 100% of the regular HOMI threshold, using components of, for example, an electro-optic modulator (EOM) for the actuator 104. The improved performance compares with only ~80% of the regular HOMI threshold using a commercial controller, for example, the Polastay controller made by General Photonics.

An illustrative description of operation of the apparatus 100 is presented, for explanatory purposes. The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A fiber amplifier system, comprising:
 a polarization actuator for receiving a signal beam from a master oscillator and adjusting the polarization of the signal beam in accordance with a control signal;
 a fiber amplifier for receiving the adjusted signal beam from the polarization controller and generating an amplified output beam; and
 a dither signal generator for generating a dither waveform, said dither waveform input to the polarization actuator as the control signal;
 wherein parameters of said dither waveform are selected based on the thermal diffusion time across a core of the fiber amplifier so that the dither waveform does not trigger polarization-induced high order mode instability (PI-HOMI).

2. The fiber amplifier system of claim 1 wherein a period of the dither waveform is much less than the thermal diffusion time.

3. The fiber amplifier system of claim 1 wherein a slew rate of the dither waveform is much slower than the thermal diffusion time.

4. The fiber amplifier system of claim 3 wherein the slew rate is reduced by reducing the amplitude in degrees of a step of the dither waveform.

5. The fiber amplifier system of claim 3 wherein the slew rate is reduced by increasing the transition time between dither steps.

6. The fiber amplifier system of claim 5 wherein the dither waveform is a continuous transition, or sinusoidal, waveform.

7. The fiber amplifier system of claim 3 wherein the slew rate is defined in degrees/second on the Poincaré sphere and the slew rate is less than 1% (6 degrees of rotation on the Poincaré sphere).

8. A method of operating a fiber amplifier, comprising the steps of:
 receiving a signal beam from a master oscillator;
 adjusting the polarization of the signal beam in accordance with a control signal;
 amplifying the adjusted signal beam in an optical fiber amplifier having a core to generate an output signal;
 generating a dither waveform, the dither waveform having parameters selected based on the thermal diffusion time across the core of the fiber amplifier so that the dither waveform does not trigger polarization-induced high order mode instability (PI-HOMI) in the fiber amplifier; and combining the dither waveform with an error signal derived from the output signal to generate the control signal.

9. The method of operating a fiber amplifier of claim 8 wherein a period of the dither waveform is much less than the thermal diffusion time.

10. The method of operating a fiber amplifier of claim 8 wherein a slew rate of the dither waveform is much slower than the thermal diffusion time.

11. The method of operating a fiber amplifier of claim 10 wherein the slew rate is reduced by reducing the amplitude in degrees of a step of the dither waveform.

12. The method of operating a fiber amplifier of claim 10 wherein the slew rate is reduced by increasing the transition time between dither steps.

13. The method of operating a fiber amplifier of claim 12 wherein the dither waveform is a continuous transition, or sinusoidal, waveform.

14. The method of operating a fiber amplifier system of claim 10 wherein the slew rate is defined in degrees/second on the Poincaré sphere and the slew rate is less than 1% (6 degrees of rotation on the Poincaré sphere).

15. A fiber amplifier system, comprising:
a master oscillator generating a signal beam;
a polarization actuator for receiving the signal beam from the master oscillator and adding a polarization dither in accordance with a feedback signal before outputting the signal beam to the fiber amplifier;
a fiber amplifier for receiving the signal beam and outputting an amplified beam;
a beam sampler for receiving an output of the fiber amplifier;
polarization filter, coupled to the beam sampler, for transmitting only power contained within a desired output state of polarization (SOP); and
a controller for generating the feedback signal, the controller further comprising:
a dither signal generator for generating a dither waveform;
a processor, coupled to the polarization filter and the dither signal generator for generating an error signal; and
a summer coupled to the dither signal generator and the processor for generating the feedback signal;
wherein parameters of said dither waveform generated by the dither signal generator are selected based on the thermal diffusion time across a core of the fiber amplifier so that the dither waveform does not trigger polarization-induced high order mode instability (PI-HOMI).

16. The fiber amplifier system of claim 15 wherein a period of the dither waveform is much less than the thermal diffusion time.

17. The fiber amplifier system of claim 15 wherein a slew rate of the dither waveform is much slower than the thermal diffusion time.

18. The fiber amplifier system of claim 17 wherein the slew rate is reduced by reducing the amplitude in degrees of a step of the dither waveform.

19. The fiber amplifier system of claim 17 wherein the slew rate is reduced by increasing the transition time between dither steps.

20. The fiber amplifier system of claim 19 wherein the dither waveform is a continuous transition, or sinusoidal, waveform.

* * * * *